(12) United States Patent
Albrecht et al.

(10) Patent No.: US 11,449,512 B2
(45) Date of Patent: Sep. 20, 2022

(54) VALUE HELP FUNCTIONALITY IN DISTRIBUTED CLOUD ENVIRONMENT

(71) Applicant: SAP SE, Walldorf (DE)

(72) Inventors: Zoltan Albrecht, Karlsruhe (DE); Janosch Fock, Hamburg (DE)

(73) Assignee: SAP SE, Walldorf (DE)

( * ) Notice: Subject to any disclaimer, the term of this patent is extended or adjusted under 35 U.S.C. 154(b) by 450 days.

(21) Appl. No.: 16/659,994

(22) Filed: Oct. 22, 2019

(65) Prior Publication Data

US 2021/0117429 A1 Apr. 22, 2021

(51) Int. Cl.
*G06F 16/245* (2019.01)
*G06F 16/2455* (2019.01)
*G06F 16/25* (2019.01)

(52) U.S. Cl.
CPC ...... *G06F 16/24561* (2019.01); *G06F 16/252* (2019.01)

(58) Field of Classification Search
CPC .................. G06F 16/24561; G06F 16/252
See application file for complete search history.

(56) References Cited

U.S. PATENT DOCUMENTS

2021/0027013 A1* 1/2021 Leme .................... G06F 40/174

* cited by examiner

*Primary Examiner* — Baoquoc N To
(74) *Attorney, Agent, or Firm* — Buckley, Maschoff & Talwalkar LLC

(57) ABSTRACT

A value help library includes a configuration component to store value help configuration data associated with user interface fields of an application, the value help configuration data comprising a data source and a key associated with each of the user interface fields, a data exchange component to receive value help data for a user interface field based on the data source and the key associated with the user interface field, and a value help provider component to receive a request from an application for value help data associated with a user interface field of the application and to provide the requested value help data to the application.

19 Claims, 7 Drawing Sheets

```
                                                                    ┌─ 200
┌──────────────────────────────────────────────────────────────────────┐
│ https://www.cloudCRM.com/tenant_abc                                  │
├──────────────────────────────────────────────────────────────────────┤
│ Create Organizational Entity                                         │
│                                                                      │
│     Name                                                             │
│     ┌──────────────┐                                                 │
│     └──────────────┘                                                 │
│                          ┌─ 220                                      │
│     Organization Type                                                │
│     ┌──────────────┐              ┌─ 240                             │
│     │ Glo          │                                                 │
│     ├───────────────────────────────────┐                            │
│     │ ☐ Global Business Operations (GBO)│                            │
│     │ ☐ Global Finance & Administration (GFA)│                       │
│     └───────────────────────────────────┘                            │
│                                                                      │
│                                              ┌──────┐ ┌──────┐       │
│                                              │ Next │ │Cancel│       │
│                                              └──────┘ └──────┘       │
└──────────────────────────────────────────────────────────────────────┘
```

*FIG. 2C*

```
https://www.cloudCRM.com/tenant_abc/templates/value_help_w83wu
```

Upload Value Help Data

Value Help-Enabled Field 510
[ ▼ ]

Value Help Data File   520
[            ]  [ Browse ]

[ Upload ]  [ Cancel ]

*FIG. 5*

| Key | Value |
|-----|-------|
| CBG | Cloud Business Group (CBG) |
| GBO | Global Business Operations (GBO) |
| GFA | Global Finance & Administration (GFA) |
| HR  | Human Resources (HR) |
|     |       |

*FIG. 6* ered features. Moreover, the value help service must be aware of the identity and structure of all value help sources known to the existing system at design time.
VALUE HELP FUNCTIONALITY IN DISTRIBUTED CLOUD ENVIRONMENT

BACKGROUND

Conventional software applications present user interfaces which facilitate interaction therewith. Such user interfaces often include input controls for receiving data to be used by the application. For example, a user interface for creating a data record may include input controls for receiving data corresponding to different fields of the data record.

Generally, value help functionality provides a list of acceptable values which may be entered into an input control. Value help functionality is used to facilitate data entry, and/or to ensure that entered data is valid data (e.g., the data entered for a Supplier field corresponds to an actual known Supplier). In one example, and in response to user entry of a few characters into an input control, value help allows the application to present valid values which conform to the already-entered characters. In another example, the application compares a user-entered value to a list of valid values and rejects the entered value if it is not in the list. In yet another example, the valid values are presented to the user as a list and one or more values may be selected therefrom.

Typically, the valid values are associated with a keyed entry (e.g., Name) of a defined entity (e.g., Supplier). In monolithic (e.g. on-premise) systems, all entities are maintained by the system and the individual values associated with each keyed entry can be easily accessed. In distributed systems, entities are maintained by different system components and extra care is taken to ensure valid referencing of entity entries.

An existing system may integrate cloud applications into its landscape. Such a cloud application is unaware of the identity and structure of value help sources of the existing system at design time. Accordingly, when designing an input control requiring value-help functionality, a cloud application developer is unaware of the value help source key which corresponds to the input control, and is also unaware of how to access the value help source to determine the values associated with the key. Systems are desired to facilitate the provision of value help functionality to cloud applications.

BRIEF DESCRIPTION OF THE DRAWINGS

FIG. 2C is a view of a user interface of an application providing value help data according to some embodiments.

FIG. 5 is a view of a user interface of an application for uploading value help data according to some embodiments.

FIG. 6 is a view of a data file including value help data according to some embodiments.

DETAILED DESCRIPTION

The following description is provided to enable any person in the art to make and use the described embodiments. Various modifications, however, will remain readily-apparent to those in the art.

Generally, some embodiments provide value help functionality to cloud applications. Some embodiments facilitate transfer of value help information from a source system (e.g., an on-premise system) to a cloud application. Moreover, some embodiments provide standardized interfaces for accessing value help functionality and for configuring value help fields and sources in a cloud platform.

Figure 1:
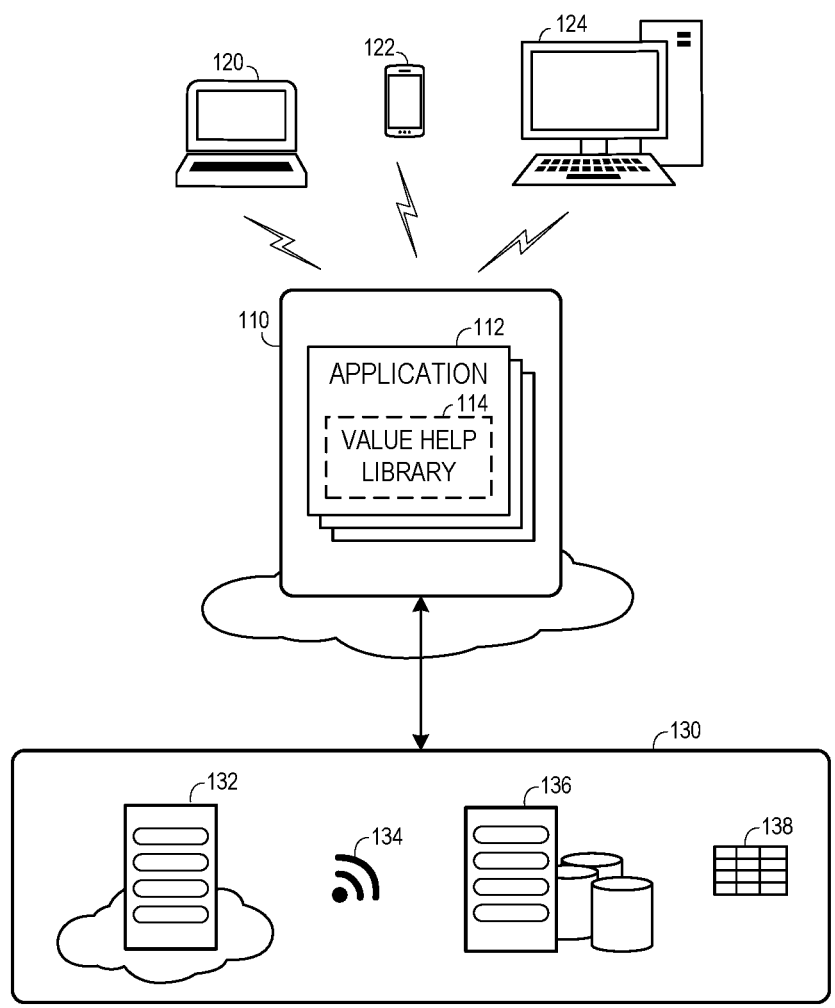
FIG. 1 illustrates a system landscape according to some embodiments.

FIG. 1 illustrates system 100 according to some embodiments. System 100 includes cloud platform 110, client devices 120-124, and data sources 130. Embodiments are not limited to the components of system 100.

Cloud platform 110 may comprise any combination of cloud-based servers within which applications 112 may execute. Cloud platform 110 may provide services, storage and other resources which may be used by applications 112. Cloud platform 110 also provides an execution environment for applications 112. According to some non-exhaustive examples, cloud platform 110 provides a Java backend for executing JavaScript applications. Embodiments may also or alternatively support other programming languages.

Cloud platform 110 may be implemented by any number of servers, virtual machines or other processing engines. Cloud platform 110 may provide elasticity by which the number of processing engines and/or storage capacity of cloud platform 110 may be expanded or contracted as needed (e.g., as needed to execute applications 112 based on demand). In some embodiments, an operator of cloud platform 110 charges a customer based on the amount of processing and/or storage used over time.

Cloud platform 110 provides value help library 114 according to some embodiments. Value help library 114 comprises components which may be embedded into the source code of one or more of applications 112 and compiled into one executable. For example, the components of value help library 114 may be executed to upload value help information (e.g., key-value pairs) for use by applications 112. The components of value help library 114 may be executed to determine value help values associated with a given input field of an application user interface. Moreover, the components of value help library 114 may be executed to define such value help fields, to specify value help sources for the value help fields, to provide credentials for accessing the value help sources, to specify value help cache settings, and to persist this configuration information for runtime access.

Data sources 130 may provide value help information to value help library 114 according to some embodiments. As non-exhaustive examples, data sources 130 include cloud server 132, stream 134, on-premise system 136 and data file 138. According to some embodiments, value help library 114 includes executable components to acquire value help information from any of data sources 130.

For example, value help library 114 may comprise components for consuming a message received from cloud server 132, as well as components for subscribing to and receiving data from stream 134. On-premise system 136 may be associated with a cloud connector which supports push/pull notifications between system 136 and value help library 114. Value help library 114 may also provide an interface accessible by a native controller of an application 112 by which the application 112 may control upload of data file 138 (e.g., .csv, .json) to cloud platform 110. The above-described configuration information for a given value help-enabled field may therefore specify the data source associated with value help information for the field as well as information for accessing the data source. This information may include URLs and credentials as well as access protocols (e.g., on-demand access, cache-based access, cache refresh policies, cache expiration policies).

Client devices 120-124 may comprise any devices suitable for accessing and presenting user interfaces of applications 112. In some examples, each of client devices 120-124 executes a Web browser to access a URL of a desired application 112 and to receive Web pages and/or other renderable data therefrom. Cloud platform 110 may transmit executable client code to such Web browsers for execution therein according to some embodiments. According to some embodiments, client devices 120-124 present user interfaces including input fields which may be value help-enabled.

Figure 2A:
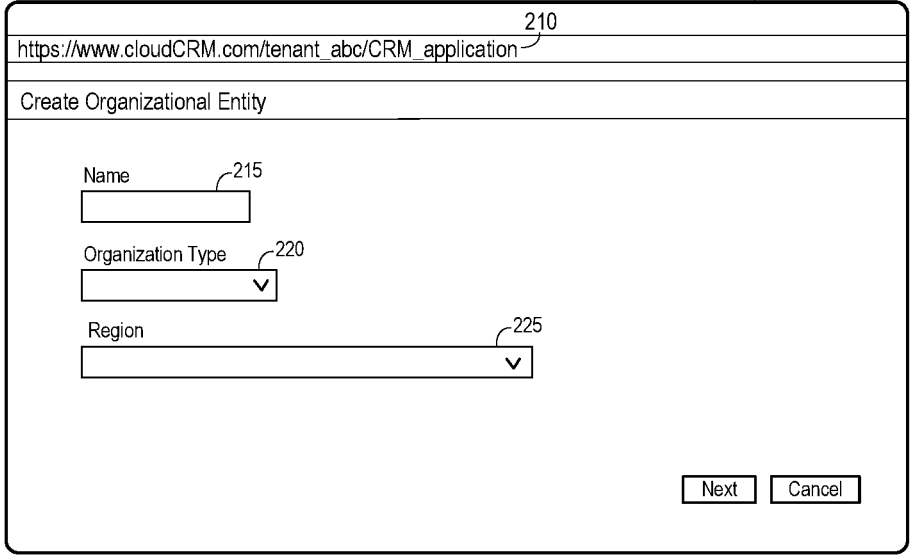
FIG. 2A is a view of a user interface of an application according to some embodiments.
Figure 2B:
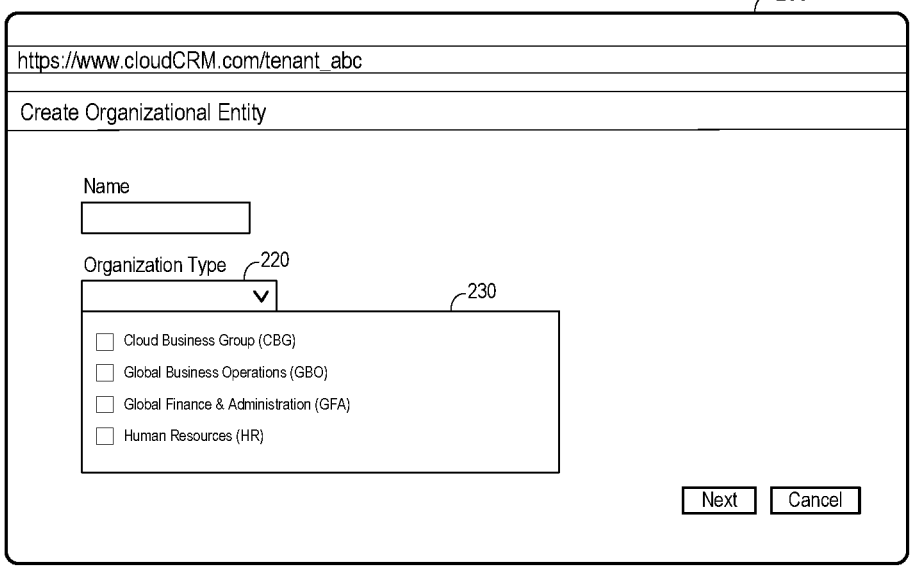
FIG. 2B is a view of a user interface of an application providing value help data according to some embodiments.

FIGS. 2A through 2C illustrate value help functionality according to some embodiments. Value help functionality is not limited to the examples provided by FIGS. 2A through 2C.

FIG. 2A depicts user interface 200. User interface 200 may be presented to a user on a display of a client device. According to some embodiments, the user has opened a Web browser and navigated to URL 210. It will be assumed that URL 210 corresponds to an application 112 executing on cloud platform 110. The application 112 therefore executes to provide user interfaces to the client device and receive input therefrom per Web protocols.

User interface 200 may comprise a user interface for creating a record associated with the application 112. The record corresponds to an organizational entity in the present example. Interface 200 includes input controls 215, 220 and 225 for inputting values of various fields of the record. Input field 215 is associated with a Name field and is not value help-enabled according to the present example. Therefore, the user may input any value into input field 215 regardless of existing values associated with other related entities. Of course, the application 112 may apply its own verification logic or requirements to input filed 215 (e.g., Initial Caps, no special characters).

Input controls 220 and 225 are value help-enabled according to the present example. Specifically, the application 112 allows input control 220 to specify one of a particular set of Organization Types, and input control 225 to specify one of a particular set of Regions. As will be described below, the particular sets of Organization Types and Regions may be provided to the application 112 in an independent, maintainable and efficient manner according to some embodiments.

FIG. 2B illustrates interface 200 after selection of input control 220 according to some embodiments. As shown, selection of input control 220 results in display of window 230. Window 230 presents selectable values associated with input control 220. The selectable values comprise value help information associated with input control 220 according to some embodiments. The user may select one (or more, depending on the UI settings associated with input control 220) of the values of window 230 to ensure entity consistency within the corresponding application 112.

According to some embodiments, selection of input control 220 causes the application 112 to access components of value help library 114 to determine whether input control 220 is value help-enabled and, if so, to determine value help information associated with input control 220. The components of value help library 114 may retrieve the value help information from a cache or from another source and provide the value help information to application 112. In some embodiments, the determination of whether input control 220 is value help-enabled and of the associated value help information occurs prior to providing user interface 200 to the client device.

FIG. 2C illustrates another paradigm for providing value help information according to some embodiments. Input control 220 comprises an input field into which the user has entered the characters "Glo". Based on the value help information associated with input control 220, the application 112 presents window 240 including the values of the associated value help information which include the string "Glo". The user may proceed to select a value (or multiples values) therefrom.

Figure 3:
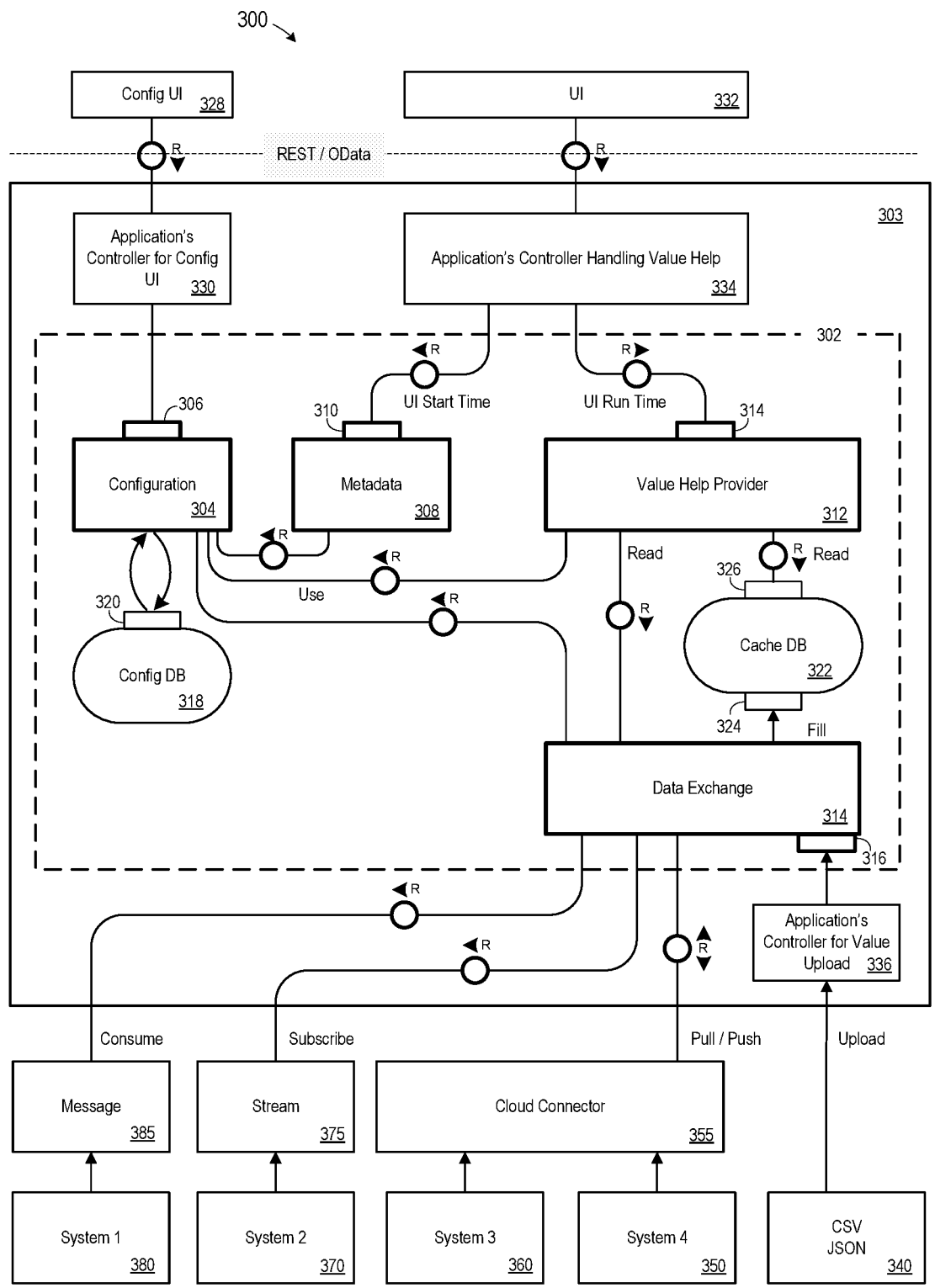
FIG. 3 is a detailed block diagram of an architecture according to some embodiments.

FIG. 3 is a detailed block diagram of architecture 300 for providing value help functionality according to some embodiments. The bold-bordered elements within dashed line 302 comprise an implementation of components of value help library 114 according to some embodiments. These elements include configuration component 304 and its corresponding inbound interface 306 for use by components of backend application instance 303. All inbound interfaces of the value help library may be called by backend application instance 303 to invoke the value help library. A platform executing backend application instance 303 may simultaneously execute another instance of a same application including the components of value help library 114. Moreover, as illustrated in FIG. 1, a same value help library 114 may be embedded into source code and compiled into the executable code of more than one other application.

In one example, an application utilizing the value help library provides configuration UI 328 to maintain value help configuration settings. The application further provides controller 330 to manage configuration UI 328 and submit the configuration settings to inbound configuration interface 306. Configuration component 304 in turn calls outbound interface 320 provided by the application to persist the configuration data in configuration database 318 of the application's choice. Accordingly, the value help library is not restricted to any particular storage system and may utilize the preferred database technology of the application.

Configuration settings may include but are not limited to the identification of value help-enabled fields of the application and a corresponding key (e.g., table column) for each field. Configuration may include cache settings indicating that the latest value help value list must be acquired each time value help functionality is executed (i.e., no caching), and periodic update of the value help list (i.e., caching). The update period may be configurable as well. Configuration settings may also specify the data source associated with each value help-enabled field as well as information for accessing the data source.

Some embodiments also or alternatively provide a configuration Application Programming Interface (API) for uploading of JSON-based configuration settings to configuration component 304.

At application start time (i.e., upon loading the JavaScript code of UI 332), the code requires the configuration settings of value help-enabled fields, the value help information (e.g., key+context data) associated with the value help-enabled fields, and rendering information. Application controller 334 exposes value help library API 310 for loading all required metadata. API 310 is implemented by metadata component 308 for reading all necessary information from configuration component 304. JavaScript code is only one example according to some embodiments. Embodiments may employ any other suitable UI technologies.

During runtime, when an end-user invokes value help functionality on UI 332 as described above, the backend is called to fetch the value help information. To do so, the application uses value help API 314 supporting value fetching, which is implemented by value help provider component 312.

Value help provider component 312 is invoked at runtime in response to an end-user request for value help. In order to determine its proper runtime behavior, value help provider component 312 reads all necessary information (e.g., value help fields or cache settings) from configuration component 304. If caching is off, value help provider component 312 directly accesses data exchange component 314 for live data source connection. If caching is on, value help provider component 312 either fetches the value help information from cache database 322 via outbound interface 326 provided by the application or, if not located therein, from data exchange component 314. If fetched from data exchange component 314, component 314 stores the value help information in cache database 322 for future use via application-provided outbound interface 324.

Data exchange component 314 handles all data source connection types of the value help library. Component 314 uses the stored configuration data to access data source systems such as systems 350, 360, 370 and 380 and stores fetched data in cache database 322 via outbound interface 324. Data exchange component 314 also provides inbound interface 316 against which the application maps an exposed API for direct upload of value help information. The uploaded values may, for example, conform to JSON format. A customer may determine to perform the upload manually and/or in an automated fashion at a desired frequency. If caching is enabled, data exchange component 314 stores the uploaded values in cache database 322 using outbound interface 324.

Data exchange component 314 may directly connect against destination systems 350 and 360 via cloud connector 355 in pull mode. Destination systems are logical systems wrapping URL and credentials needed to connect to data sources. Improved decoupling may be achieved by broadcasting changes made to an entity (e.g., any Create, Read, Update, or Delete operations) via messages (e.g. 385), events or streams (e.g., 375). Data exchange component 314 may therefore act as a subscriber to the messages and feeds, and to store such received data in cache database 322.

Figure 4:
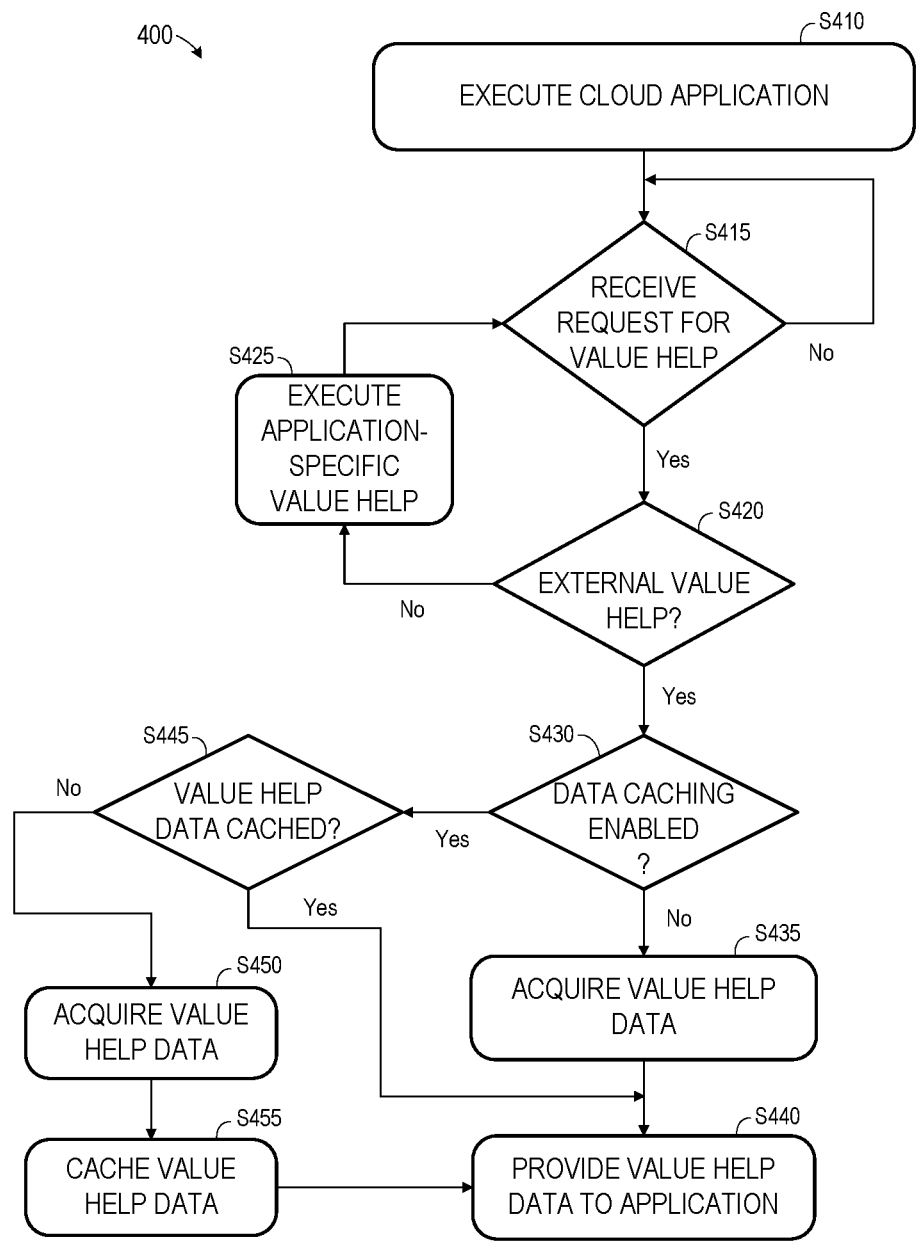
FIG. 4 is a flow diagram of a process to provide value help to a cloud-based application according to some embodiments.

FIG. 4 comprises a flow diagram of process 400 to provide value help to a cloud-based application according to some embodiments. In some embodiments, various hardware elements execute program code to perform process 400. Process 400 and all other processes mentioned herein may be embodied in computer-executable program code read from one or more of non-transitory computer-readable media, such as a non-volatile random-access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to process 400, value-help fields of a cloud application are configured. Configuration may comprise user interaction with configuration UI 328 to specify fields of a cloud application as "value help-enabled" and, for each specified field, to specify a data source for value help information and a corresponding key of the data source. Configuration may also include determination of caching preferences as described above. As mentioned above, controller 330 may submit the configuration information to configuration component 304 via interface 306. Configuration component 304 may then use interface 320 to store the configuration information in configuration database 318. According to some embodiments, configuration of the value-help fields comprises upload of a configuration file to an API provided by controller 330.

The cloud application is executed at S410. For a new UI session, execution of the application includes loading of the code of the application, the configuration settings of value help-enabled fields, the value help information (e.g., key+ context data) associated with the value help-enabled fields, and rendering information. Application value help controller 334 may receive this value help-related information at S410 from metadata component 308 via interface 310.

Flow pauses at S415 until a request for value help is received from the application. For example, the application may execute to provide user interfaces to an end-user and receive input therefrom. The application may perform any suitable operations based on the received input, including but not limited to manipulating database records. At some point during operation, the application may need to determine acceptable values for an input field. For example, with reference to FIG. 2A, the end-user may select input control 220 in order to enter information into input control 220. The application may then determine that the selection requires value help information, at which point the determination at S415 is affirmative and flow proceeds to S420.

At S420, it is determined whether input control 220 requires value help functionality specific to the application or whether external value functionality (i.e., supported by a value help library) is required. The determination at S420 may be based on the value help configuration information loaded at the start of the UI session. If the field is not specified as an external value help-enabled field, flow proceeds to S425 to execute an application-specific value help process without use of the value help library. Flow then returns to S415 to await another request of value help.

If the subject field is associated with external value help via the value help library, flow proceeds to S430 to determine whether data caching is enabled for the value help-enabled field. If data caching is not enabled, the value help data associated with the value help-enabled field is acquired from a corresponding data source at S435. The configuration information may specify the data source corresponding to the value help-enabled field, credentials for accessing the data source, a key for acquiring values corresponding to the field from the data source, and any other information needed to acquire the value help data. Next, at S440, the value help data is provided to the application for presentation to the end-user in a manner dictated by the application.

If it is determined at S430 that data caching is enabled, it is then determined at S445 whether the required value help data is located in the cache. If so, the data is retrieved from the cache (e.g., by value help provider component 312 via interface 326) and provided to the application at S440. If the required value help data is not located in the cache, the value help data is acquired at S450 as described with respect to S435, and then stored in the cache at S455 (e.g., by data exchange component 314 via interface 316). This data is then provided to the application at S440.

FIG. 5 depicts user interface 500 for uploading value help data according to some embodiments. With reference to architecture 300, user interface 500 may comprise an upload UI provided by an application for communicating with value upload controller 336. User interface 500 includes control 510 for specifying one of the value help-enabled fields, and input box 520 for identifying a data file including value help data for the specified value help-enabled field.

FIG. 6 is a tabular representation of value help data file 600 according to some embodiments. Value help data file 600 includes a key corresponding to a value help-enabled field, and a value help value associated with each key. The values may be used as described above to provide value help functionality. File 600 may be uploaded to cache 322 using an upload UI such as interface 500.

Figure 7:
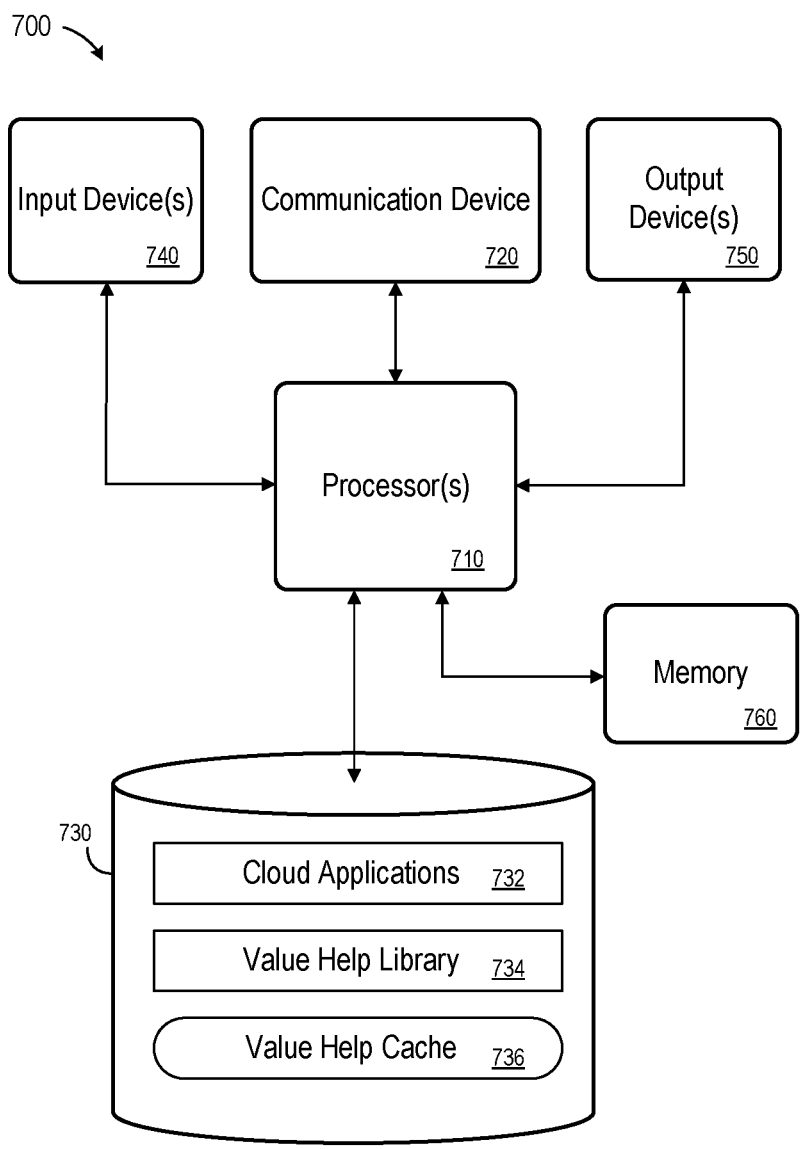
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of architecture 300 in some embodiments. Apparatus 700 may include other unshown elements according to some embodiments.

Apparatus 700 includes processor(s) 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen), a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Cloud applications 732 may comprise executable program code for execution on a cloud platform. One or more of cloud applications 732 may access components of value help library 734 as described herein to provide value help functionality to end-users as described herein. The components of value help library 734 are executed as described above to store and retrieve value help information in and from value help cache 736. Embodiments are not limited to execution of these processes by a single apparatus. Data storage device 730 may also store data and other program code for providing additional functionality and/or which are necessary for operation of apparatus 700, such as other application services, device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer memory storing a library of processor-executable program code comprising:
   a configuration component to store value help configuration data associated with user interface fields of a cloud-based application, the value help configuration data comprising a data source and a corresponding data source key pre-specified for each of the user interface fields;
   a data exchange component to receive value help data including the data source key and context data for a user interface field based on the data source and the data source key pre-specified for the user interface field; and
   a value help provider component to receive a request from an application for value help data associated with a user interface field of the application and to provide the requested value help data to the application.

2. A library according to claim 1, further comprising:
   a metadata component to retrieve first configuration data associated with user interface fields of the application and provide the first configuration data to the application.

3. A library according to claim 2, the value help provider component to determine whether the requested value help data associated with the user interface field of the application is cached, and
   if it is determined that the requested value help data associated with the user interface field of the application is cached, to retrieve the requested value help data from a cache using an interface of the application.

4. A library according to claim 3, wherein, if it is determined that the requested value help data associated with the user interface field of the application is not cached, the data exchange component is to retrieve the requested value help data from the data source associated with the user interface field using the key associated with the user interface field.

5. A library according to claim 1, the value help provider component to determine whether the requested value help data associated with the user interface field of the application is cached, and
   if it is determined that the requested value help data associated with the user interface field of the application is cached, to retrieve the requested value help data from a cache using an interface of the application.

6. A library according to claim 5, wherein, if it is determined that the requested value help data associated with the user interface field of the application is not cached, the data exchange component is to retrieve the requested value help data from the data source associated with the user interface field using the key associated with the user interface field.

7. A library according to claim 1, wherein the cloud-based application is unaware of the value help configuration data prior to the configuration component storing the value help configuration data.

8. A computing system comprising:
a computer memory storing processor-executable process steps; and
one or more processors to execute the processor-executable process steps to cause the computing system to execute:
a configuration component to store value help configuration data associated with user interface fields of a cloud-based application, the value help configuration data comprising a data source and a corresponding data source key pre-specified for each of the user interface fields;
a data exchange component to receive value help data including the data source key and context data for a user interface field based on the data source and the data source key pre-specified for the user interface field; and
a value help provider component to receive a request from an application for value help data associated with a user interface field of the application and to provide the requested value help data to the application.

9. A computing system according to claim 8, the one or more processors to execute the process steps to cause the computing system to execute:
a metadata component to retrieve first configuration data associated with user interface fields of the application and provide the first configuration data to the application.

10. A computing system according to claim 9, the value help provider component to determine whether the requested value help data associated with the user interface field of the application is cached, and
if it is determined that the requested value help data associated with the user interface field of the application is cached, to retrieve the requested value help data from a cache using an interface of the application.

11. A computing system according to claim 10, wherein, if it is determined that the requested value help data associated with the user interface field of the application is not cached, the data exchange component is to retrieve the requested value help data from the data source associated with the user interface field using the key associated with the user interface field.

12. A computing system according to claim 8, the value help provider component to determine whether the requested value help data associated with the user interface field of the application is cached, and
if it is determined that the requested value help data associated with the user interface field of the application is cached, to retrieve the requested value help data from a cache using an interface of the application.

13. A computing system according to claim 12, wherein, if it is determined that the requested value help data associated with the user interface field of the application is not cached, the data exchange component is to retrieve the requested value help data from the data source associated with the user interface field using the key associated with the user interface field.

14. A system comprising:
a computer memory storing processor-executable program code comprising:
a configuration component to store value help configuration data associated with user interface fields of a cloud-based application, the value help configuration data comprising a data source and a corresponding data source key pre-specified for each of the user interface fields;
a data exchange component to receive value help data including the data source key and context data for a user interface field based on the data source and the data source key pre-specified for the user interface field; and
a value help provider component to receive a request from an application for value help data associated with a user interface field of the application and to provide the requested value help data to the application.

15. A system according to claim 14, further comprising:
a metadata component to retrieve first configuration data associated with user interface fields of the application and provide the first configuration data to the application.

16. A system according to claim 15, the value help provider component to determine whether the requested value help data associated with the user interface field of the application is cached, and
if it is determined that the requested value help data associated with the user interface field of the application is cached, to retrieve the requested value help data from a cache using an interface of the application.

17. A system according to claim 16, wherein, if it is determined that the requested value help data associated with the user interface field of the application is not cached, the data exchange component is to retrieve the requested value help data from the data source associated with the user interface field using the key associated with the user interface field.

18. A system according to claim 14, the value help provider component to determine whether the requested value help data associated with the user interface field of the application is cached, and
if it is determined that the requested value help data associated with the user interface field of the application is cached, to retrieve the requested value help data from a cache using an interface of the application.

19. A system according to claim 18, wherein, if it is determined that the requested value help data associated with the user interface field of the application is not cached, the data exchange component is to retrieve the requested value help data from the data source associated with the user interface field using the key associated with the user interface field.

* * * * *